United States Patent
Cencioni

(10) Patent No.: US 9,000,871 B2
(45) Date of Patent: Apr. 7, 2015

(54) CASE FOR A TABLET-TYPE ELECTRONIC DEVICE, IN PARTICULAR A TABLET COMPUTER

(75) Inventor: Fabio Cencioni, Cesate (IT)

(73) Assignee: Tucano S.r.l. (IT)

( * ) Notice: Subject to any disclaimer, the term of this patent is extended or adjusted under 35 U.S.C. 154(b) by 0 days.

(21) Appl. No.: 13/446,795

(22) Filed: Apr. 13, 2012

(65) Prior Publication Data

US 2012/0268891 A1 Oct. 25, 2012

(30) Foreign Application Priority Data

Apr. 14, 2011 (IT) .............................. MI2011U0127

(51) Int. Cl.
| | | |
|---|---|---|
| H01F 7/00 | (2006.01) |
| H01F 1/00 | (2006.01) |
| H05K 7/02 | (2006.01) |
| B65D 5/52 | (2006.01) |
| B65D 25/24 | (2006.01) |
| G06F 1/16 | (2006.01) |

(52) U.S. Cl.
CPC ...... *G06F 1/1656* (2013.01); *G06F 2200/1633* (2013.01); *G06F 1/1626* (2013.01)

(58) Field of Classification Search
USPC ................. 335/219, 285, 302–306, 205–207; 439/38, 218, 217, 39; 24/303; 361/807, 361/679.01, 600; 206/45.2, 45.23, 45.24, 206/305, 320, 764, 765; 345/111
See application file for complete search history.

(56) References Cited

U.S. PATENT DOCUMENTS

| | | | | |
|---|---|---|---|---|
| 6,829,140 | B2 * | 12/2004 | Shimano et al. | ......... 361/679.09 |
| 7,735,644 | B2 * | 6/2010 | Sirichai et al. | ................ 206/320 |
| 2008/0302687 | A1 * | 12/2008 | Sirichai et al. | ................ 206/320 |
| 2009/0159763 | A1 * | 6/2009 | Kim | .............................. 248/174 |
| 2010/0238119 | A1 | 9/2010 | Dubrovski et al. | |
| 2011/0284420 | A1 * | 11/2011 | Sajid | ............................. 206/576 |
| 2012/0037523 | A1 * | 2/2012 | Diebel et al. | .................. 206/320 |
| 2012/0066865 | A1 * | 3/2012 | Lauder et al. | .................... 16/382 |
| 2012/0068797 | A1 * | 3/2012 | Lauder et al. | ................. 335/285 |
| 2012/0068798 | A1 * | 3/2012 | Lauder et al. | ................. 335/306 |
| 2012/0068799 | A1 * | 3/2012 | Lauder et al. | ................. 335/306 |
| 2012/0068942 | A1 * | 3/2012 | Lauder et al. | ................. 345/173 |
| 2012/0069502 | A1 * | 3/2012 | Lauder et al. | ............ 361/679.01 |

(Continued)

FOREIGN PATENT DOCUMENTS

| | | | |
|---|---|---|---|
| DE | 202011000599 | 10/2011 | ............. A45C 11/24 |
| EP | 2280527 | 2/2011 | ............. H04M 1/02 |

OTHER PUBLICATIONS

European Search Report, Appln. No. 12164200.3-1972/2511790, May 9, 2014.

*Primary Examiner* — Mohamad Musleh

(74) *Attorney, Agent, or Firm* — Matthew A. Pequignot; Pequignot + Myers LLC

(57) ABSTRACT

A case for a tablet-type electronic device, in particular a tablet computer, comprises a casing shaped so as to at least partially cover a rear surface of the device and equipped with fastener members for fastening it to the device; the casing is equipped with a magnetic coupler element, acting from a rear surface of the casing and able to cooperate with a corresponding fastener element carried by a protective cover for the screen of the device, so as to magnetically fasten the cover to the casing on the rear of the device.

8 Claims, 3 Drawing Sheets

(56) References Cited

U.S. PATENT DOCUMENTS

| | | | |
|---|---|---|---|
| 2012/0069503 A1* | 3/2012 | Lauder et al. | 361/679.01 |
| 2012/0069540 A1* | 3/2012 | Lauder et al. | 361/807 |
| 2012/0194308 A1* | 8/2012 | Lauder et al. | 335/219 |
| 2012/0194448 A1* | 8/2012 | Rothkopf | 345/173 |
| 2012/0194997 A1* | 8/2012 | McClure et al. | 361/679.55 |
| 2012/0211377 A1* | 8/2012 | Sajid | 206/216 |
| 2013/0027867 A1* | 1/2013 | Lauder et al. | 361/679.29 |
| 2013/0076614 A1* | 3/2013 | Ive et al. | 345/156 |

\* cited by examiner ic device, in particular a tablet computer.

CASE FOR A TABLET-TYPE ELECTRONIC DEVICE, IN PARTICULAR A TABLET COMPUTER

The present invention relates to a case for a tablet-type electronic device.

Here and in the following, a tablet-type electronic device is intended as a portable electronic device with a generically flat shape and incorporating a flat "touch screen"; in particular, tablet computers, eBook readers, smartphones, etc., fall within this definition.

BACKGROUND OF THE INVENTION

One highly successful model of tablet computer is the Apple iPad; a cover is available for this device that comprises a hinge, which magnetically attaches to an edge of the device's casing, and a folding cover element, joined to the hinge and covering the screen of the device; thanks to the hinge, the cover element can be rotated to position it on the rear of the device (leaving the screen accessible) and is formed by a number of mutually foldable segments so that it can assume various configurations, in which the cover becomes a stand to hold the device in various positions. The segments are constituted by respective rigid (metallic) plates sheathed in a flexible covering. The outer frame of the device has opportunely distributed magnets to fasten the hinge and keep the cover shut (i.e., positioned over the screen) and, at the same time, activate/deactivate the device.

Although efficient, versatile and functional, the cover just described still has room for improvement.

In particular, the cover only protects the screen of the tablet computer and not the rear body, which thus remains exposed to the risk of damage, scratching, etc.

Furthermore, when the cover element is completely folded back (against the rear surface of the device), it is not fastened to the body of the device in any way, other than by the hinge; the cover element is therefore free to move, bend and rotate, which could be annoying when the user lifts or handles the device.

SUMMARY OF THE INVENTION

The object of this invention is to overcome the drawbacks pointed out herein by providing a case for tablet-type electronic devices, in particular for a tablet computer, which is particularly simple, effective and easy to use.

The present invention thus relates to a case for a tablet-type electronic device, in particular a tablet computer, comprising a casing shaped to at least partially cover a rear surface of the device and is equipped with fastener members for fastening it to the device, the casing being equipped with a magnetic coupler element acting from a rear surface of the casing and able to cooperate with a corresponding fastener element carried by a protective cover for the screen of the device, so as to magnetically fasten the cover to the casing on the rear of the device.

The case of the invention can be used together with the covers supplied by the manufacturer of the electronic device, or also incorporate its own cover.

In both cases, when the cover is folded onto the rear of the device, it remains fastened to the casing without causing annoyance or obstruction.

The case of the invention is therefore particularly simple, effective and easy to use.

BRIEF DESCRIPTION OF THE DRAWINGS

Further characteristics and advantages of the present invention will become evident from the description of the following non-limitative examples of embodiment, with reference to the figures in the attached drawings, where.

DETAILED DESCRIPTION OF THE INVENTION

Figure 1:
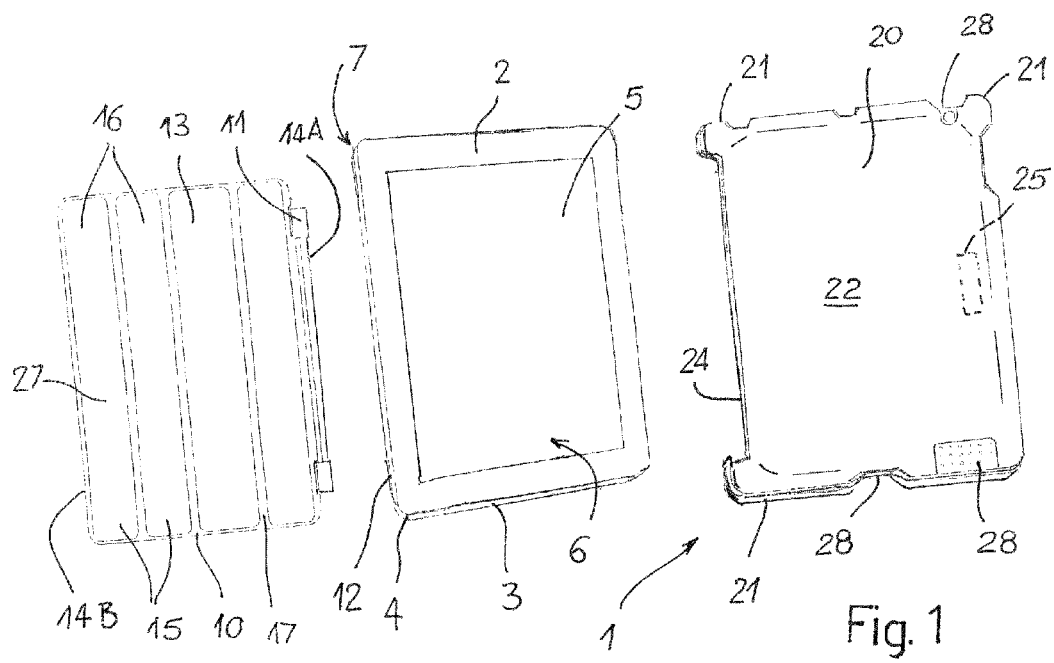
FIG. 1 is an exploded, schematic, perspective view of a tablet-type electronic device equipped with a foldable cover and a case according to the invention.

In FIG. 1, reference numeral 1 indicates a case for a tablet-type electronic device 2, in particular a tablet computer. In the example shown, the device 2 is in fact a tablet computer, in particular an Apple iPad (registered trademarks owned by Apple Inc.).

In general, the device 2 comprises a body 3, generically flat and delimited by an outer edge 4, and a flat touch screen 5 that constitutes a front surface 6 of the device 2. The body 3 has a rear surface 7, opposite and substantially parallel to the screen 5 and surface 6; the surfaces 6, 7 and/or the edge 4 are optionally equipped with controls and/or various auxiliary devices (not shown—for example microphone, speakers, camera, etc.).

The device 2 is paired with a cover 10, comprising: a hinge 11, which magnetically couples to the body 3 of the device 2, for example a side 12 of the edge 4, and a foldable cover element 13, rotatably connected to the hinge 11 and shaped so as to cover the screen 5.

The hinge 11 has a longitudinally elongated body made of a suitable metallic material that couples onto the body 3, being attracted by specially provided magnets (not shown) housed in the body 3.

Once the hinge 11 is fastened to the device 2, the cover element 13 can rotate, thanks to the hinge 11, around an axis A (parallel to the side 12 of the device 2) for being moved to the rear of the device 2 (leaving the screen 5 accessible).

The cover element 13 has one hinged end 14A, connected to the hinge 11, and one free end 14B, opposite to the hinged end 14A.

The cover element 13 is formed by a number of mutually foldable segments 15 for assuming various configurations, in which the cover 10 becomes a stand to keep the device 2 in different positions. The segments 15 are constituted by respective, substantially rigid (metallic) plates 16, sheathed in or connected to a flexible covering 17 that enables the rotation of the segments 15 with respect to each other.

The body 3 houses opportunely distributed magnets that, in addition to fastening the hinge 11, also serve to keep the cover element 13 closed (i.e., positioned over the screen 5) and, at the same time, activate/deactivate the device 2.

Figure 2:
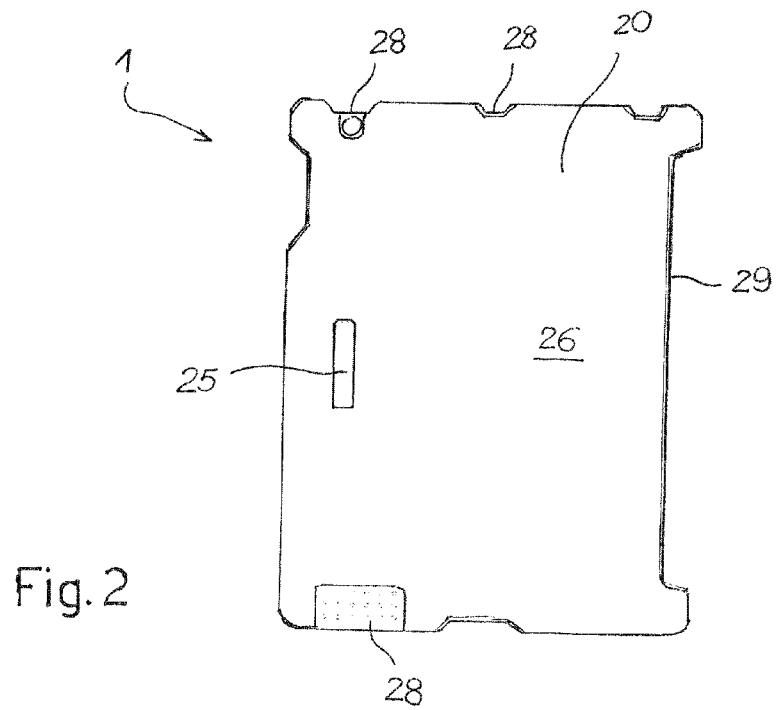
FIG. 2 is a rear plan view of the case in FIG. 1.
Figure 3:
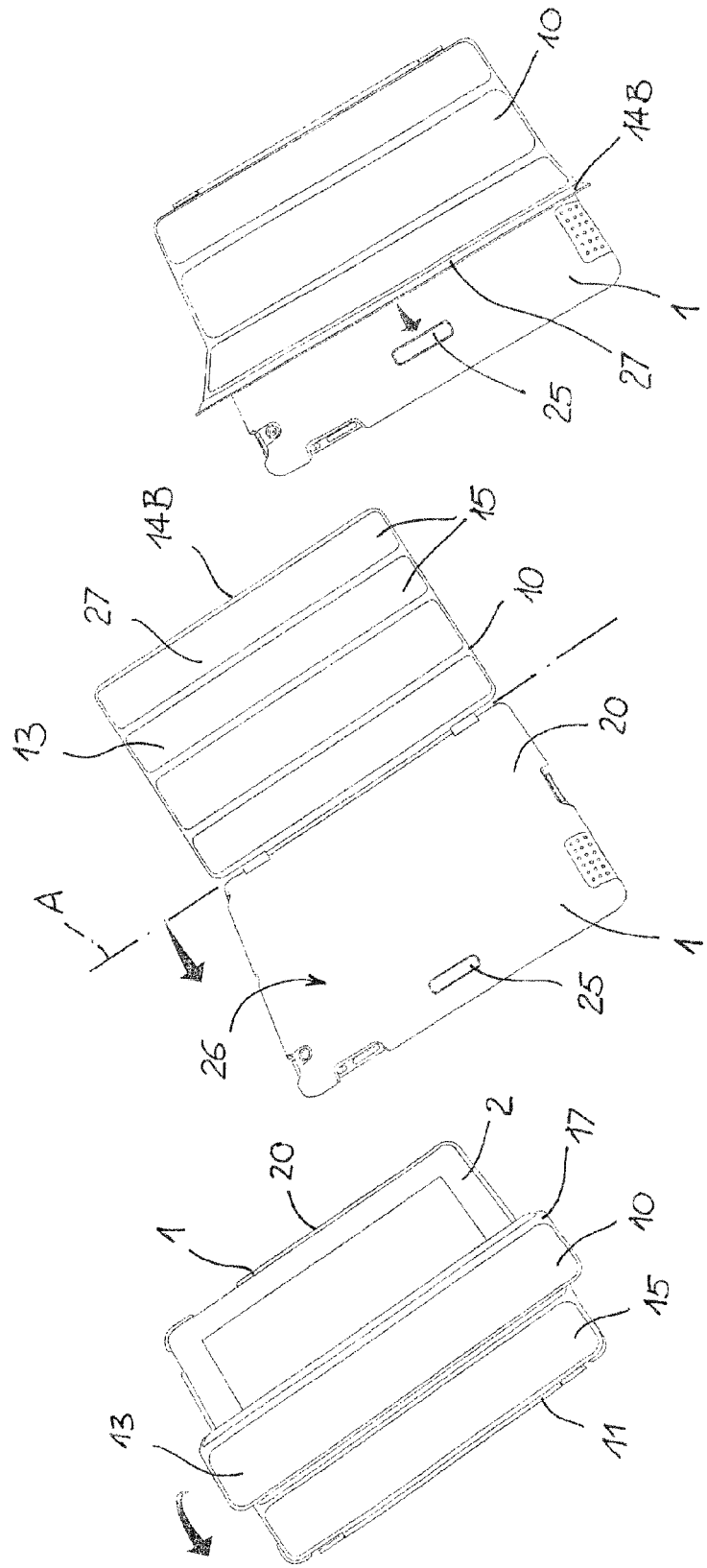
FIGS. 3A, 3B, 3C are schematic perspective views of the electronic device in FIG. 1, in which the case is fitted on the device and the cover is shown in respective usage configurations.

With reference to FIGS. 2-3 as well, the case 1 comprises a casing 20 shaped so as to at least partially cover the rear surface 7 of the device 2 and equipped with fastener members 21 for fastening it onto the device 2.

In particular, the casing 20 has a concave seat 22 shaped to receive the device 2 and, specifically, its rear surface 7; the seat 22 is delimited by a bottom wall 23 of the casing 20, substantially facing surface 7 of the device 2, and by lateral edges 24, raised with respect to the bottom wall 23.

The fasteners members 21 are, for example, defined by respective projections formed on the lateral edges 24, or by the edges 24 themselves, and are shaped to fit on the edge 4 of the body 3 in a snap-fit, interference-fit, or any other manner, for example, thanks to the elasticity of the material of which they are made.

The casing 20 is equipped with a magnetic coupler element 25, acting from a rear surface 26 of the casing 20 (i.e., from an outer surface of the bottom wall 23) and able to cooperate with corresponding fastener element 27 carried on the cover 10, so as to magnetically fasten the cover 10 (and specifically cover element 13) to the casing 20 on the rear of the device 2.

The magnetic coupler element 25 and the fastener element 27 are constituted by respective elements that magnetically attract each other: one of the two elements is therefore a magnet and the other a metallic element attracted by the magnet, or the two elements are two magnets that attract each other, etc.

Advantageously, the magnetic coupler element 25 is arranged close to a lateral edge of the casing 20 and the fastener element 27 is arranged at the free end 14B of the cover element 13.

The magnetic coupler element 25 preferably comprises a magnet, while the corresponding fastener element 27 is defined by a metallic element constituted, for example, by the plate 16 of one of the segments 15, in particular the free end segment 15 (the one furthest away from the hinge 11).

As schematically shown in FIGS. 3A, 3B and 3C, the cover 10 is moveable (thanks to the hinge 11) between a front position, in which the cover 10 covers the screen 5 of the device 2, and a rear position, in which the cover 10 is folded onto the rear of the device 2 and covers the rear surface 26 of the casing. In the front position, the cover 10 is fastened to the device 2 by the magnet integrated in the device 2, which attracts the plate 16 of the free end segment 15, while in the rear position, it is the magnetic coupler element 25 of the casing 20 that attracts the plate 16 of the same free end segment 15, thus magnetically fastening the cover 10, and specifically cover element 13, to the casing 20.

The magnetic coupler element 25 and the corresponding fastener element 27 are positioned (on the casing 20 and the cover 10 respectively) so as to magnetically cooperate when the cover 10 is in the rear position, thus fastening the cover element 13 onto surface 26.

Alternatively, it is understood that the magnetic coupler element 25 of the casing 20 can comprise a metallic element (not a magnet) that is attracted by a magnet carried on the corresponding fastener element 27 of the cover 10.

The casing 20 has a plurality of functional seats 28, defined by respective recesses, notches and/or openings made in the bottom wall 23 and/or in the lateral edges 24 in correspondence to the auxiliary devices of the device 2.

The casing 20 also has a lateral recess 29, positioned along a side of the casing 20 and shaped to receive the body 14 of the hinge 11 and allow coupling of the hinge to the device 2 and movement of the hinge 11.

Figure 4:
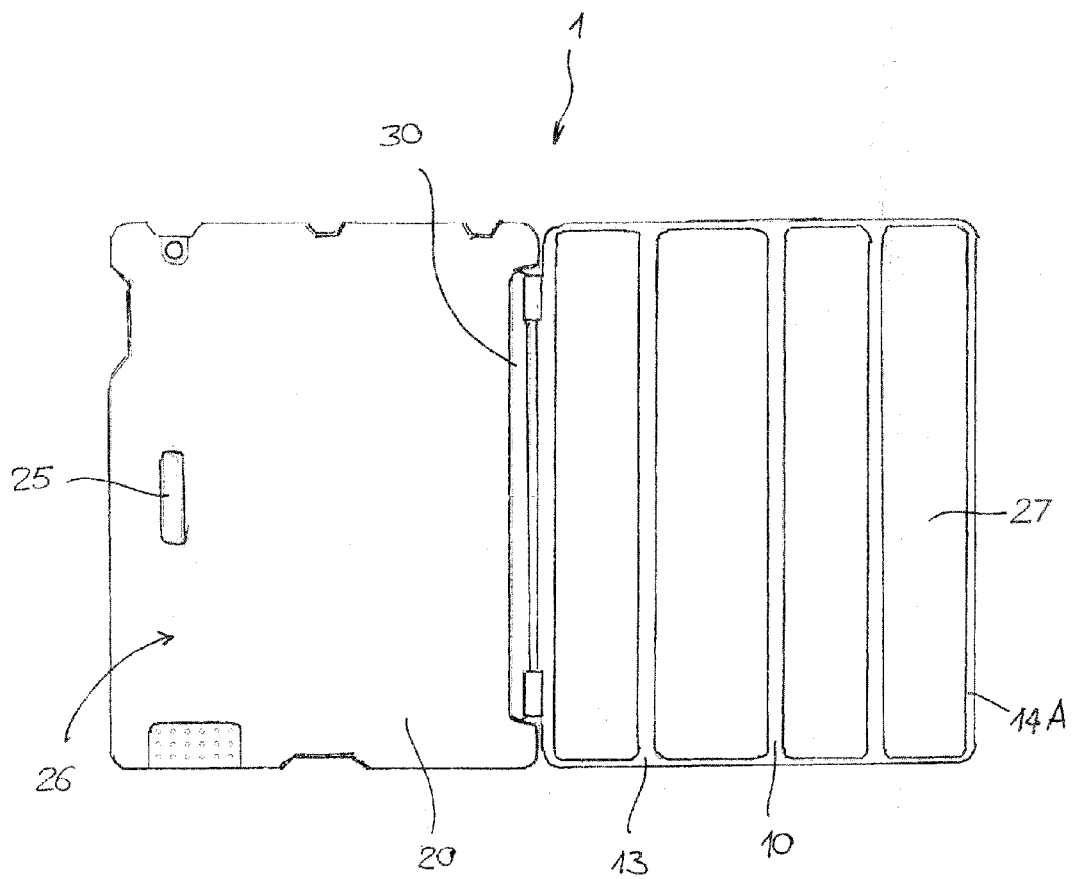
FIG. 4 is a schematic plan view of a case according to a different embodiment of the invention.

In the variant shown in FIG. 4, in which details similar or identical to those already described are indicated with the same reference numerals, the case 1 also incorporates the cover 10, which is joined to the casing 20 by a hinge portion 30 that substitutes hinge 11; the hinge portion 30 comprises, for example, a pin that engages the seats carried on the casing 20 and to which an edge of the cover element 13 is coupled, or is constituted by a flexible portion, for example, in a polymeric material, leather, or other flexible material.

The case 1 therefore comprises the casing 20 and the cover 10 having a cover element 13 that can be of the previously described type (i.e., formed by foldable segments) or otherwise; for example, it could be constituted by a rigid or flexible sheet.

In any case, the casing 20 and the cover element 13 are respectively equipped with the magnetic coupler element 25 and the fastener element 27, magnetically cooperating with each other.

It is evident that both the casing 20 and the cover 10, and in particular the cover element 13, can be made from various materials, such as, for example, more or less rigid polymeric materials, elastomeric materials, flexible materials, leather, fabric, etc.

Finally, it is understood that further changes and modifications can be made to the case described herein without leaving the scope of the appended claims.

The invention claimed is:

1. A case (1) for a tablet-type electronic device (2), in particular a tablet computer, comprising a casing (20) shaped so as to at least partially cover a rear surface (7) of a body (2) of the device (2), on the opposite side of and substantially parallel to a screen (5) that constitutes a front surface (6) of the device (2), and equipped with fastener members (21) for detachably fastening the casing (20) to the device (2), the casing (20) being equipped with a magnetic coupler element (25), acting from a rear surface (26) of the casing (20) and able to cooperate with a corresponding fastener element (27) carried by a protective cover (10) for the screen (5) of the device (2), so as to magnetically fasten the cover (10) to the casing (20) on the rear of the device (2); and wherein the cover (10) is moveable between a front position, in which the cover (10) covers the screen (5) of the device (2), and a rear position, in which the cover (10) is folded onto the rear of the device (2), and covers the rear surface (26) of the casing while leaving the screen (5) exposed for use; and the magnetic coupler element (25) and the corresponding fastener element (27) are so positioned on the casing (20) and the cover (10) respectively so as to magnetically cooperate when the cover (10) is in the rear position, when the screen (5) is exposed for use by the user.

2. A case according to claim 1, wherein the magnetic coupler element (25) and the fastener element (27) are constituted by respective elements that magnetically attract each other.

3. A case according to claim 1, wherein the magnetic coupler element (25) is arranged close to a lateral edge of the casing (20) and the fastener element (27) is arranged at a free end (14B) of the cover (10), so as to magnetically fasten said free end (14B) of the cover (10) to the casing (20).

4. A case according to claim 1, wherein the magnetic coupler element (25) comprises a magnet, while the corresponding fastener element (27) is defined by a metallic element.

5. A case according to claim 1, wherein the casing (20) has a concave seat (22) shaped to receive the device (2) and delimited by a bottom wall (23) of the casing (20) and the lateral edges (24) raised with respect to the bottom wall (23).

6. A case according to claim 1, wherein the casing (20) has a plurality of functional seats (28), defined by respective recesses, notches and/or openings made in the bottom wall (23) and/or in the lateral edges (24) of the casing (20) and which, when the case (1) is fitted to the device (2), are in correspondence to respective auxiliary devices of the device (2).

7. A case according to claim 1, wherein the casing (20) has a lateral recess (29), positioned along a side of the casing (20) and shaped to receive a hinge (11) of the cover (10) and allow the coupling of the hinge (11) to the device (2) and movement of the hinge (11).

8. A case according to claim 1, comprising the casing (20) and the cover (10), which is joined to the casing (20) by a hinge portion (30).

\* \* \* \* \*